United States Patent [19]

Stedman et al.

[11] 4,152,991
[45] May 8, 1979

[54] RIPPING APPARATUS

[75] Inventors: Robert N. Stedman, Chillicothe; James E. Gee, Washington, both of Ill.

[73] Assignee: Caterpillar Tractor Co., Peoria, Ill.

[21] Appl. No.: 810,540

[22] Filed: Jun. 27, 1977

Related U.S. Application Data

[63] Continuation-in-part of Ser. No. 726,394, Sep. 24, 1976, abandoned.

[51] Int. Cl.² ............................................. E01B 27/00
[52] U.S. Cl. ................................... 104/7 R; 37/104; 105/215 C; 172/181; 172/192; 172/304
[58] Field of Search ........................ 37/104–107; 104/7 A, 7 R, 2, 1 R; 105/215 C; 171/16; 172/793, 699, 663–668, 180, 181, 192, 301, 302, 304

[56] References Cited

U.S. PATENT DOCUMENTS

| | | | |
|---|---|---|---|
| 3,055,309 | 9/1962 | Moss | 104/7 A |
| 3,415,327 | 12/1968 | Hanser | 172/793 |
| 3,436,848 | 4/1969 | Peppin et al. | 37/104 |
| 3,457,660 | 7/1969 | Speno | 37/105 |
| 3,515,222 | 6/1970 | Kant | 172/667 |
| 3,598,186 | 8/1971 | Coontz | 172/666 |
| 3,604,513 | 9/1971 | Tassone | 172/667 |
| 3,739,861 | 6/1973 | Johnson et al. | 172/666 |

FOREIGN PATENT DOCUMENTS

| | | | |
|---|---|---|---|
| 2226612 | 1/1973 | Fed. Rep. of Germany | 171/16 |
| 191925 | 3/1967 | U.S.S.R. | 172/667 |
| 393418 | 8/1973 | U.S.S.R. | 172/699 |

*Primary Examiner*—Francis S. Husar
*Assistant Examiner*—Ross Weaver
*Attorney, Agent, or Firm*—Charles E. Lanchantin, Jr.

[57] ABSTRACT

A ripping apparatus includes a housing having a bearing assembly therein which is connected to a support member of a vehicle, a ripper mechanism having a shaft member pivotally mounted in the bearing assembly, a lever arm connected to the shaft member, a material ripping element connected to the bottom of the shaft member, and a fluid operated linear actuator connected to the support member and to the lever arm for rotating the ripping element between a retracted position and a transversely disposed working position. The ripping apparatus is particularly adapted to shatter a compacted railroad bed underneath the rail and supporting ties.

3 Claims, 10 Drawing Figures

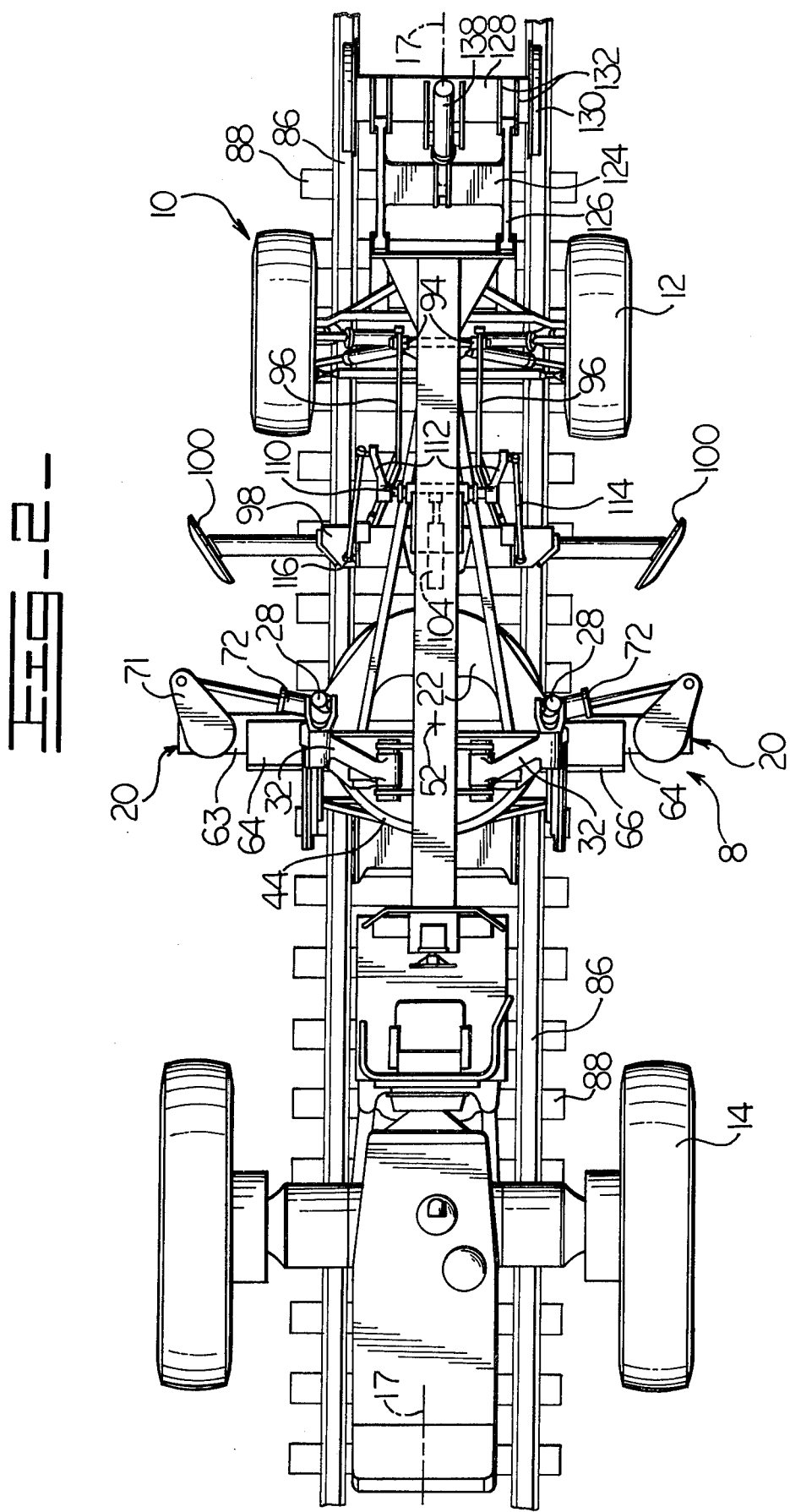

Fig-3-
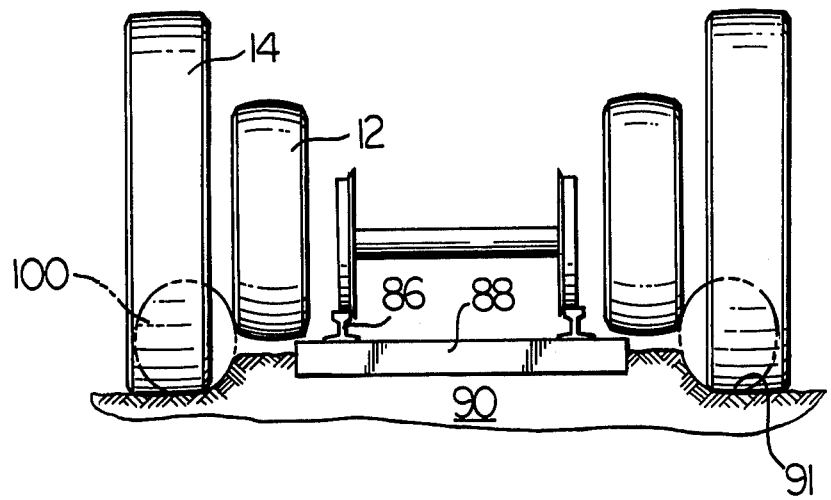
Fig-4-
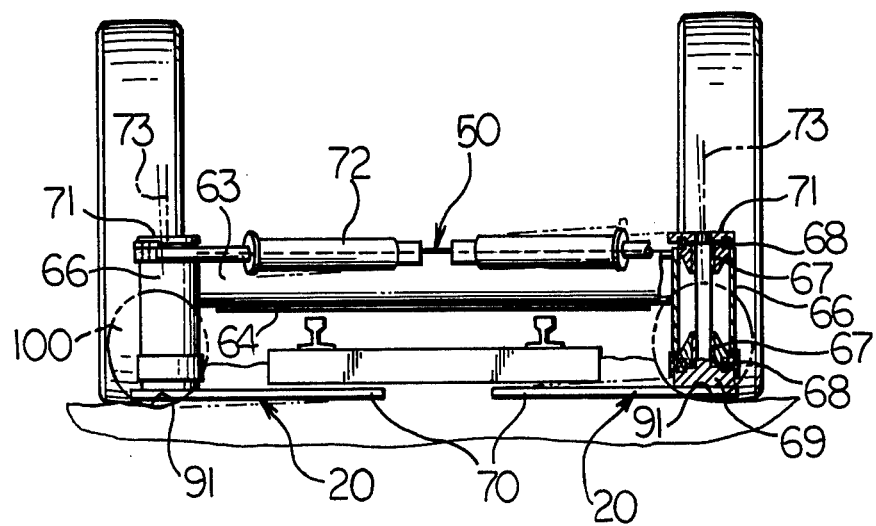

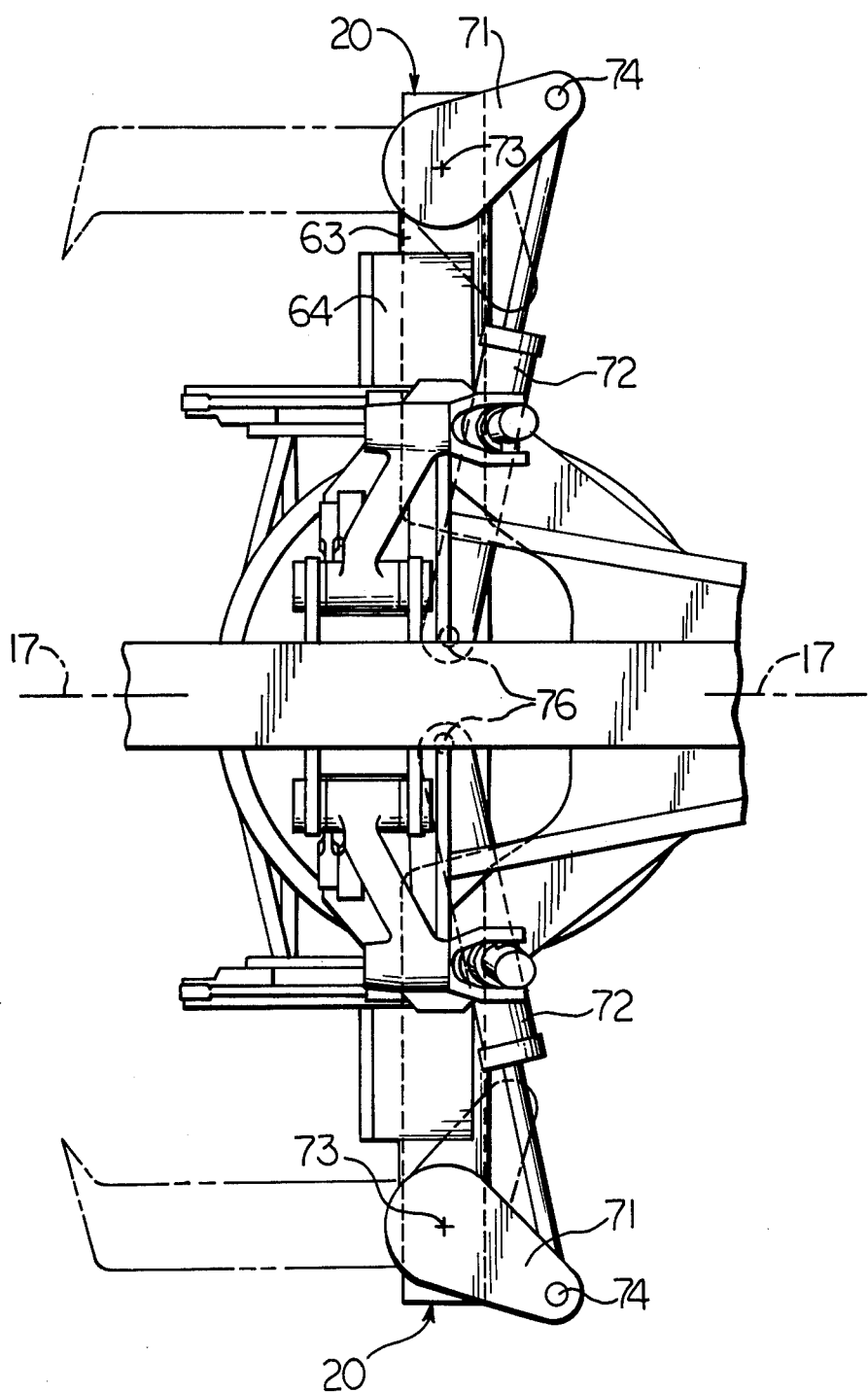

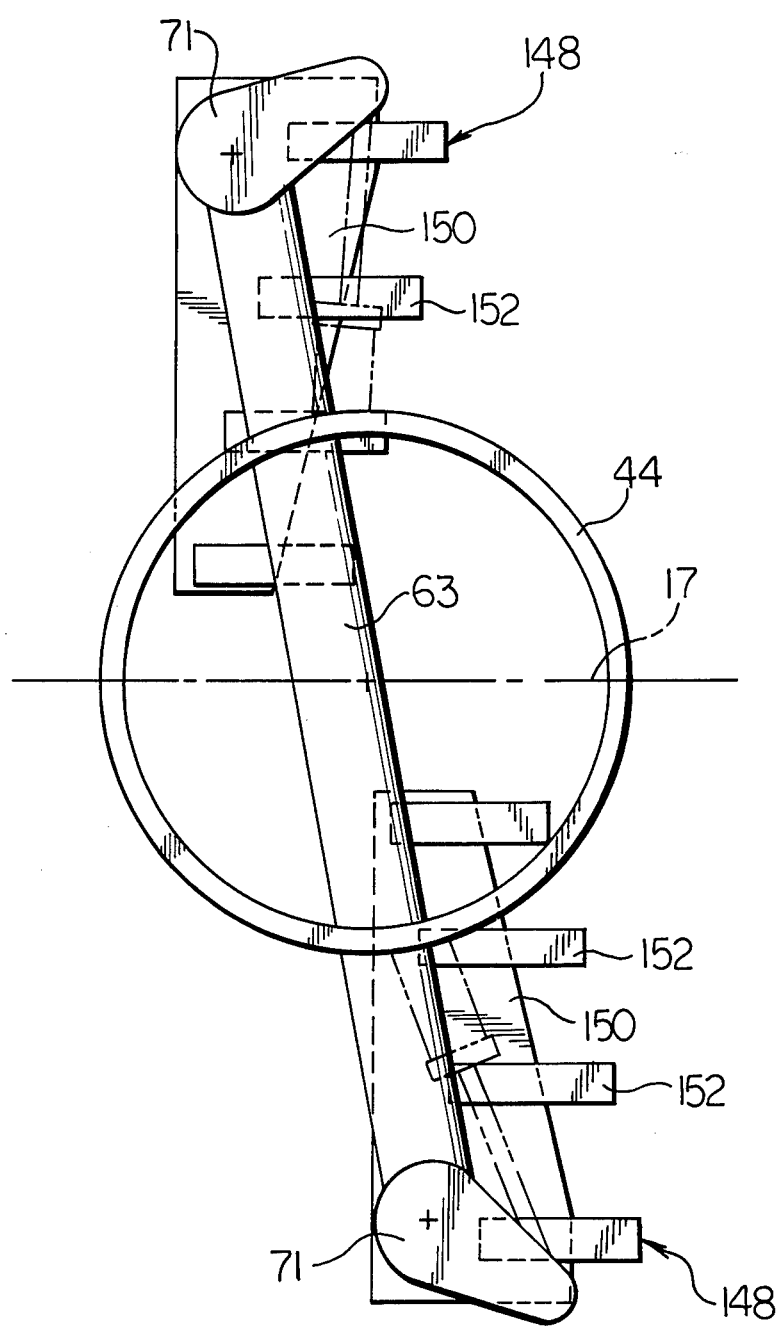

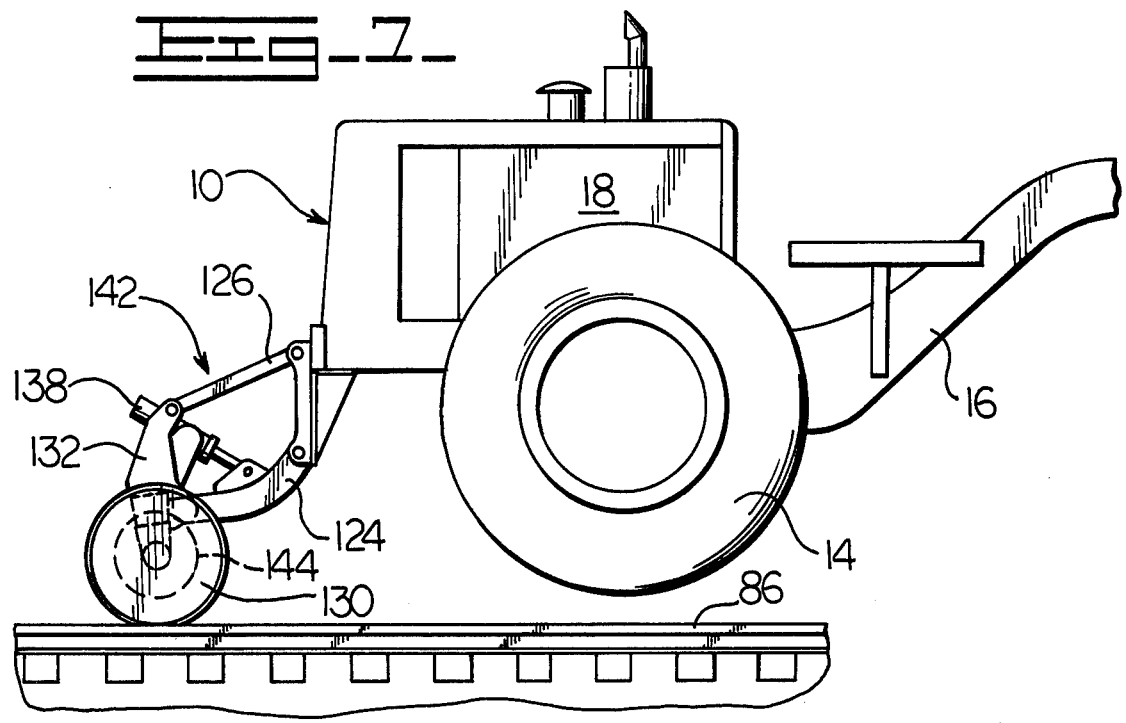
Fig_7_
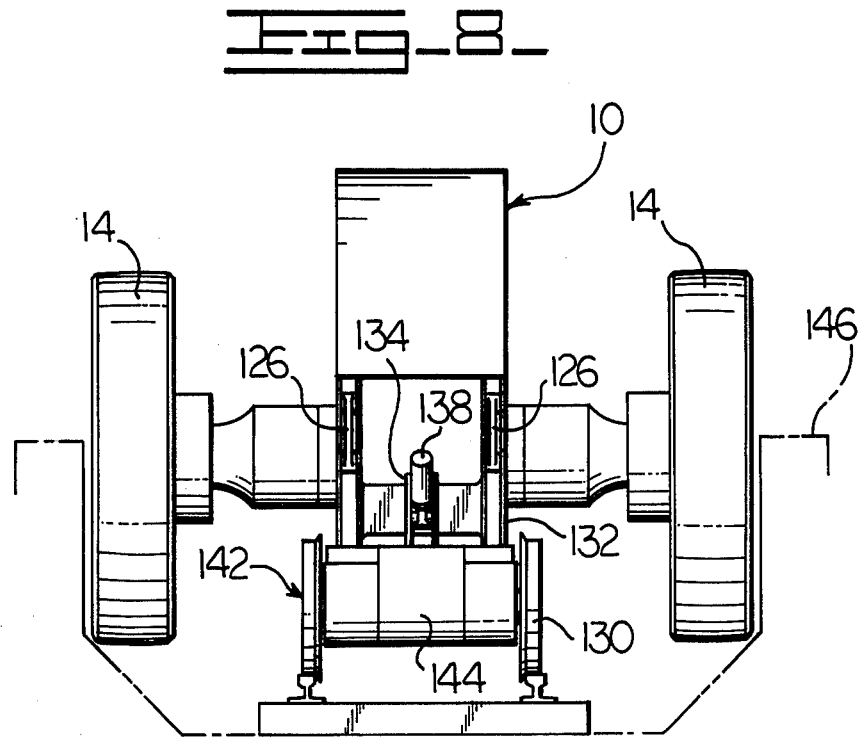
Fig_8_

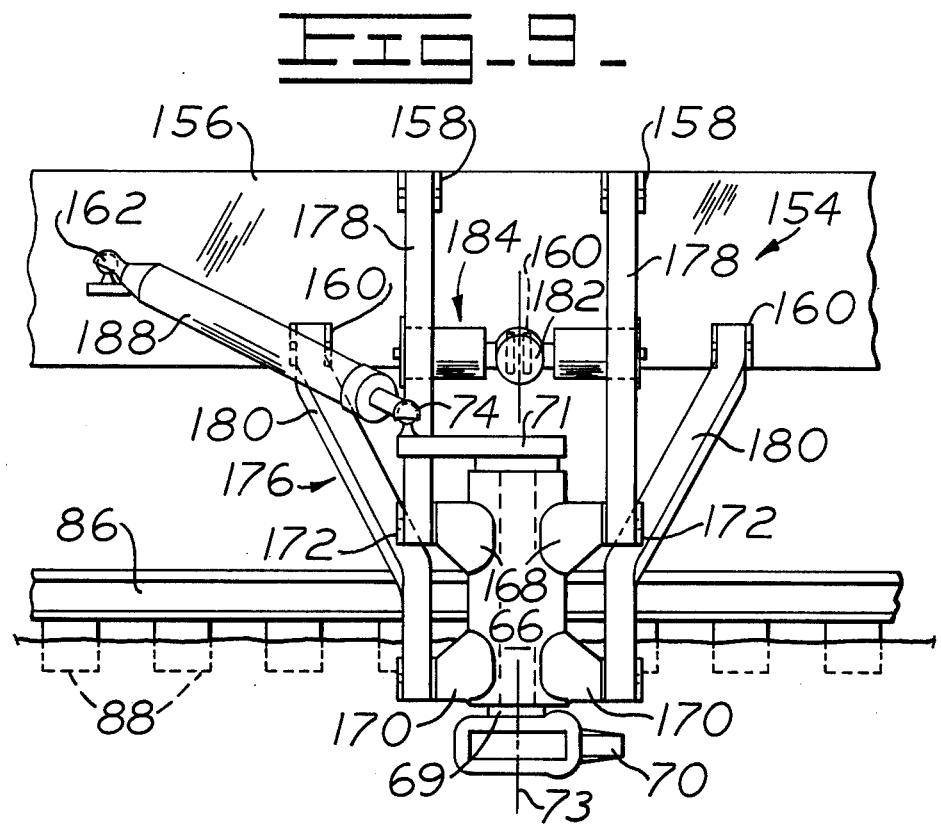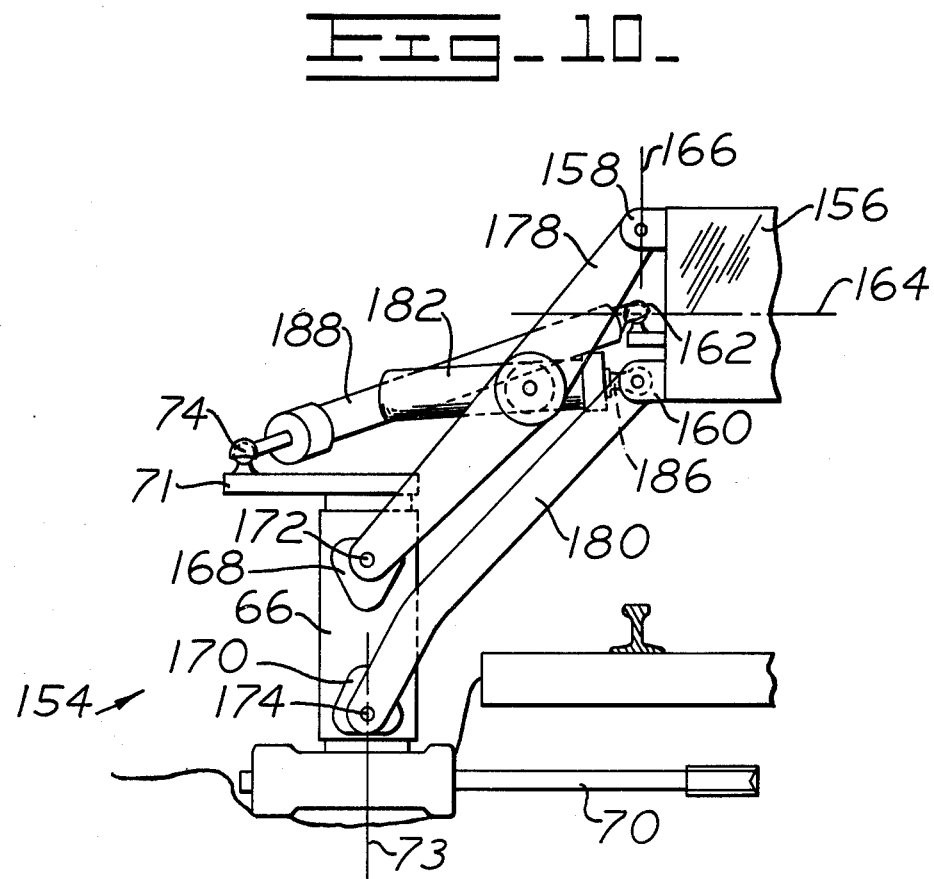

RIPPING APPARATUS

This is a continuation-in-part application of Ser. No. 726,394, filed Sept. 24, 1976, now abandoned.

BACKGROUND OF THE INVENTION

This invention relates to a ripping apparatus which is particularly effective for penetrating and shattering a railroad bed during forward motion of the vehicle on which it is mounted.

In general, complex rail mounted equipment having an extended length is utilized to reprocess the compacted material of the ballast bed. For example, ballast cleaning and replacement equipment with recirculating excavating chains and conveyor belts have been used to remove and carry ballast from underneath the ties or sleepers to screening and reprocessing equipment, and thereafter to carry the clean ballast back to form a new bed. This equipment must be kept within a predetermined transverse profile in order to pass through bridge tunnels and the like, and to maintain a minimum interference with traffic traveling on an adjacent railbed. Such equipment is also costly to operate and is capable of processing only a limited amount of roadbed length per hour. This is due in part to the high wear rates of the cutting teeth and edges of the chains.

Therefore, it may be appreciated that the low ground speed of the ballast bed cleaning and replacement equipment, and the associated time required to service the equipment, adds to the high cost of operating a railroad. To a significant degree, the highly compacted nature of the ballast bed contributes to these maintenance expenses.

Therefore, what is needed is a ripping apparatus that is able to effectively fracture the earth and ballast bed preparatory to the aforementioned ballast cleaning and replacement equipment. Preferably, the ripping apparatus should be mounted on a self-powered vehicle and include a support arrangement therefor that will enable it to be conveniently positioned into a variety of working attitudes to better match the conditions encountered. For example, the support arrangement should allow effective raising and lowering of the ripping element between the traveling and working modes of operation, and should permit the ripping element to be swung in a substantially horizontal plane between a retracted traveling position and a transversely disposed working position.

Another desirable feature that the ripping apparatus should provide is an extended side reach in order to enable the ripper mechanism to fracture compacted material underneath ties, offset switches, frogs and the like. Moreover, its angle of inclination should be adjustable also, so that the ripping element will draw into the ground when desired or will float at the correct working angle when the vehicle is powered forwardly.

Another problem is that of providing a vehicle and associated ripping apparatus that can travel over either irregular terrain or highways to reach the work area, and can easily be driven into alignment with the ballast bed.

Exemplifying the prior art in the area of track ballast undercutting mechanisms are U.S. Pat. No. 3,436,848 issued Apr. 8, 1969 to R. A. Peppin, et al and West German Pat. No. 2,226,612 issued Jan. 4, 1973. However, such constructions are deficient in that high working forces on the ripping elements are resisted by rotary reversible motors having an inherently poor mechanical advantage with respect to the pivot axis thereof. Accordingly, high working pressures on the motors are required to resist the rotational forces with the attendant disadvantages thereof. While another Patent, namely U.S. Pat. No. 3,457,660 issued July 29, 1969 to M. J. Speno, teaches a construction with a ripping element mounted on a holder pivotally secured to a base plate and a fluid actuated cylinder therefor, such construction is undesirable because of the vulnerability of the working components thereof to damage in use. Particularly, the working components thereof are complex, are disposed in a low elevational disposition, and exhibit a relatively poor mechanical advantage is resisting the rotational forces on the holder.

SUMMARY OF THE INVENTION

The present invention is directed to overcoming one or more of the problems as set forth above.

According to the present invention this is accomplished by providing a housing having a bearing assembly therein which is connected to a support member on the vehicle, a ripper mechanism having a shaft member pivotally mounted in the bearing assembly, a lever arm connected to the top of the shaft member, a material ripping element connected to the bottom of the shaft member, and a fluid operated linear actuator connected to the support member and to the lever arm for rotating the ripping element between a retracted position and a transversely disposed working position.

Advantageously, the present invention features a ripping apparatus which can effectively fracture compacted earth or other material from one side thereof during its forward movement, a ripping apparatus that may be conveniently positioned to a variety of working attitudes, and a ripping apparatus that can better withstand the high working forces on the ripping element.

Other advantages of the present invention will become more readily apparent upon reference to the accompanying drawings and the following description.

BRIEF DESCRIPTION OF THE DRAWINGS

FIG. 2 is a top plan view of the ripping apparatus and vehicle shown in FIG. 1.

FIG. 3 is a fragmentary and diagrammatic transverse sectional view of several of the important elements of the vehicle of FIGS. 1 and 2 with respect to the railroad bed.

FIG. 4 is another diagrammatically simplified transverse sectional view similar to FIG. 3, only showing details of construction of the ripping apparatus including a pair of opposite ripper mechanisms for fracturing the ballast bed.

FIG. 5 is an enlarged, fragmentary top plan view of a central portion of FIG. 1 to better show the ripper mechanisms in both a working condition and in a retracted condition.

FIG. 6 is an enlarged and fragmentary diagrammatic view of an alternate embodiment ripper mechanism and illustrating an optionally rotated or offset mode of operation thereof.

FIG. 7 is a fragmentary side elevational view of the rear portion of the vehicle shown in FIG. 1 with an optional attachment therefor.

FIG. 8 is a diagrammatic rear elevational view of FIG. 7 showing a predetermined tunnel or bridge profile therewith.

FIG. 9 is a diagrammatic side elevational view of a second alternate embodiment ripping apparatus constructed in accordance with the present invention.

FIG. 10 is a diagrammatic front elevational view of the second alternate embodiment ripping apparatus illustrated in FIG. 9.

DESCRIPTION OF THE PREFERRED EMBODIMENT

Figure 1:
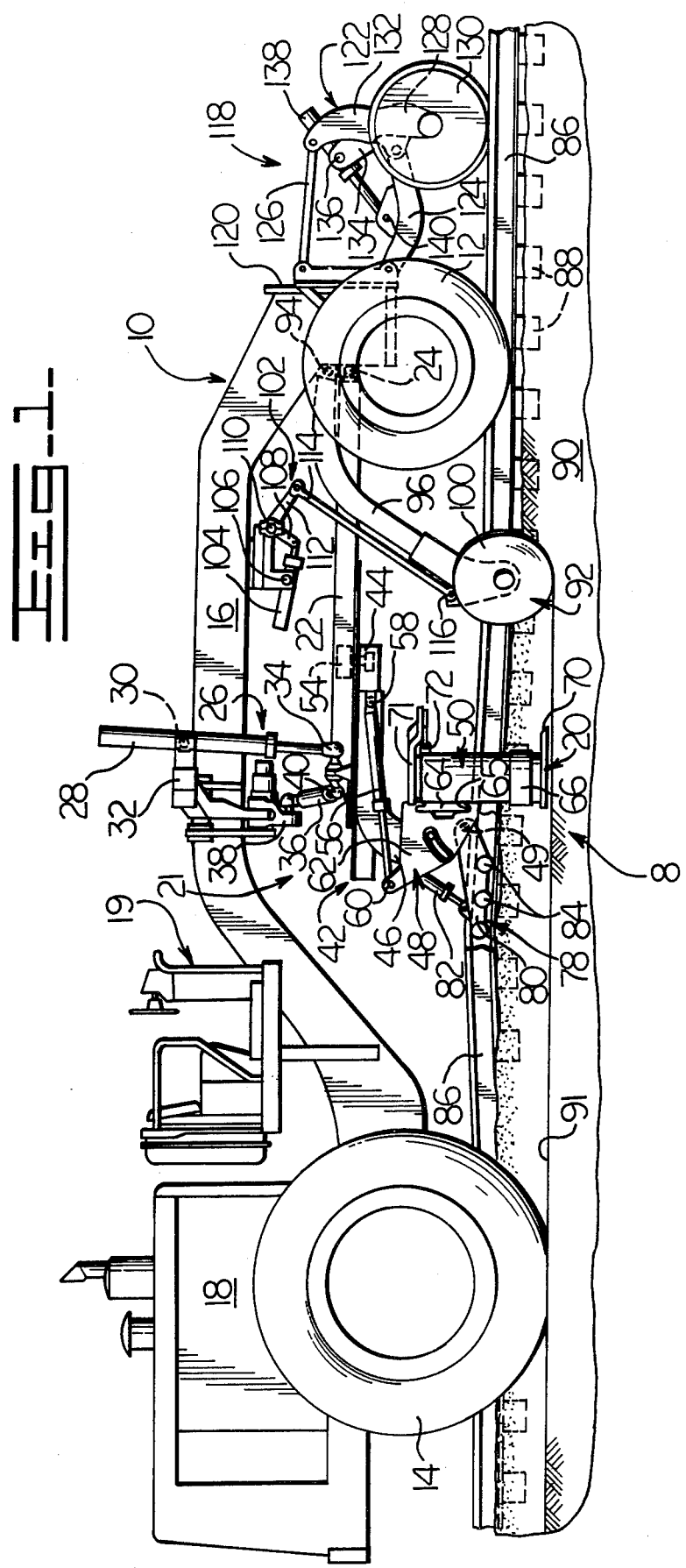
FIG. 1 is a side elevational view of the ripping apparatus of the present invention on a wheeled vehicle and disposed in a working mode of operation with respect to a railroad bed.

Referring initially to FIGS. 1 and 2, there is shown an earth or ballast bed ripping apparatus 8 as mounted on a self-propelled wheeled vehicle 10 in accordance with the present invention. Basically, however, the wheeled vehicle is a modified motor grader having a pair of steerable front wheels 12, a larger diameter pair of rear driving wheels 14, and a main frame 16 spanning between them symmetrically along a longitudinally extending centerline 17. While a power plant 18 and an operator station 19 are disposed on the rear of the frame, the ripping apparatus including an opposite pair of ripper mechanisms 20 is suspendingly supported to the mid-point thereof by a versatile support arrangement 21.

Particularly, the support arrangement 21 includes a base frame or drawbar assembly 22 which is universally mounted by a ball joint 24 to a rear face of the main frame 16 at the front thereof. A positioning device 26 supports and positions the rear portion of the drawbar assembly and includes a pair of vertically oriented lift links or extendable hydraulic jacks 28. These jacks are universally pivotally mounted by a pair of support joints 30 on a pair of arms 32 extending from the opposite sides of the main frame, and are coupled to the drawbar assembly at a pair of ball joints 34. The device further includes a laterally extending side shifting or stabilizing hydraulic jack 36 mounted to a support member 38 and thus to the main frame at one thereof, while its other end is coupled to the drawbar assembly at a ball joint 40. Thus, the rear portion of the drawbar assembly is adaptable to be raised, lowered, tilted or side shifted by suitable manipulation of the opposite jacks 28 and the jack 36 about the front ball joint 24.

In accordance with one aspect of the present invention, the opposite ripping mechanisms 20 are suspendingly mounted below the drawbar assembly 22 on a rotatable mounting assembly 42. Particularly, the mounting assembly includes a rotatable circle mount 44 with a pair of depending legs 46 secured thereto on the opposite sides thereof, a tippable mount 48 rockably secured to the lower portion of the legs at a pair of aligned joints 49, and a holding structure 50 suitably secured to the tippable mount for pivotally supporting the ripper mechanisms on each side thereof.

More specifically, the circle mount 44 is supported by the drawbar assembly 22 so that it may be rotated about an upright central axis 52 and in a generally horizontal plane by a drive motor 54 geared internally thereto. A pair of tipping hydraulic jacks 56 are coupled to the legs 46 of the circle mount on the opposite sides thereof at a pair of pivot joints 58, and extend generally rearwardly to be coupled to the tippable mount 48 at a pair of pivot joints 60 formed on a pair of opposite side walls 62 thereof.

Referring now to FIGS. 4 and 5 and to the holding structure 50 for the opposite ripper mechanisms 20, it includes a supporting cross tube or beam 63 with a laterally elongated rear reinforcement plate 64 integrally attached thereto. As shown in FIG. 1, this plate is interlockingly slidably received in a recess 65 formed in each of the side walls 62 of the tippable mount 48 so that the holding structure may be laterally adjusted and locked in place at a centered or offset location with respect to the circle mount 44 in order to obtain additional side reach for one of the ripper mechanisms 20.

As is representatively shown at the right side when viewing FIG. 4, the holding structure 50 includes a depending tubular housing or support standard 66 with a pair of elevationally spaced apart and upright bearing assemblies 67 mounted thereon and a protecting annular seal 68 disposed outwardly of each end thereof. Accordingly, one of the ripper mechanisms 20, including a cylindrical base and integrally associated upstanding shaft 69 is mounted for rotary movement within these bearing assemblies. An elongated flat ripping blade 70 is secured at a right angle substantially to the bottom of the base and a combined cap and lever arm 71 is secured substantially to the top of the shaft, so that with extension or retraction of a fluid operated linear actuator or blade adjusting hydraulic jack 72 the blade may be rotated as required about an upright pivot axis 73. As best shown in FIG. 5 the hydraulic jacks 72 of both ripper mechanisms 20 are generally symmetrically and oppositably disposed between a pair of pivot joints 74 on the lever arms and a pair of pivot joints 76 on the cross tube 63. Consequently, retraction of both jacks from the positions shown will cause the blades to be rotated from a working position as illustrated in broken lines substantially normal to the centerline 17 to a retracted position substantially parallel thereto as illustrated in phantom lines. While the inner ends of the blades are spaced a predetermined distance apart, it is to be recognized that they are still capable of shattering the earth between them.

A rail and tie lifting apparatus 78 is mounted on the legs 46 of the circle mount 44 as shown best in FIG. 1. This apparatus includes a pair of rearwardly extending opposite arms 80 which are pivoted to the legs at the pivot joints 49 and are rockable thereon through extension or retraction of an upright lifting jack 82 pivotally secured thereto and to the legs. Accordingly, the lifting apparatus, including a plurality of guide rollers 84, is positionable laterally inwardly for rolling carrying engagement with the underside of the upper flanges of an opposite pair of railroad rails 86. Thus, with retraction of the lifting jack the arms and the guide rollers secured thereto are raised to lift the rails and a plurality of railroad ties 88 away from a ballast bed 90 of compacted crushed stone or agglomerated gravel and fine material.

As is best illustrated in FIGS. 1 and 4, provision is made for preparing a channel or path 91 through the ballast bed 90 laterally outwardly of the ends of the ties 88 for the support standards 66 of the ripper mechanisms 20 and for the rear wheels 14. To accomplish this an accessory double plow apparatus 92 is mounted to the main frame 16 as by a rod-like pivot joint 94. As shown in FIGS. 1 and 2, such apparatus includes a pair of arms 96 which extend downwardly from this pivot joint and rearwardly symmetrically at the opposite sides of the main frame to be secured to a cross beam 98. An angled plowing disc 100 is mounted on the opposite ends of the beam in lateral alignment with the support standards and rear wheels. In order to selectively elevate these discs a powered lifting device 102 is used therewith which includes an extendable hydraulic jack 104 pivotally secured to the main frame 16 at a central trunnion mount 106. An arm 108 is secured to the frame by a combination pivot joint and cross shaft arrangement 110 and is pivotally attached to the jack, while a pair of forwardly extending arms 112 are pivotally attached to the shaft arrangement symmetrically on the opposite ends thereof. A pair of lift links 114 are pivotally secured to the arms 112 and extend downwardly to a pair of pivot joints 116 on the cross beam 98. In this way retraction of the jack will cause the discs to be lowered to increase the depth of the paths cut through the ballast bed. Note is made of the fact that the discs are angled to lift material and direct it laterally inwardly where it may advantageously be reused or processed by subsequently following processing equipment, not shown.

In order to better guide the front of the vehicle 10 longitudinally along the rails 86, and also to provide an extended wheel base or longitudinal distance forwardly of the rail and tie lifting apparatus 78 a hydraulically actuated rail wheel guiding and support apparatus 118 is mounted on a front surface 120 of the main frame 16. As best illustrated in FIGS. 1 and 2, this rail wheel apparatus includes a parallelogram linkage system 122 having a lower H-shaped member 124, an upper pair of connecting links 126, and a front axle housing 128 forming a mount for a pair of railroad wheels 130. Two pairs of arms 132 extend upwardly from the axle housing for connection to the links 126 and another pair of arms 134 form a trunnion mount 136 for an extendable hydraulic jack 138 whose lower end is connected to a joint 140 centrally formed on the lower member. Thus, extension of the jack will cause the railroad wheels to be raised relative to the front surface of the main frame and to, in effect, lower the front wheels 12 of the vehicle.

In substantially the same manner as described immediately above, a second rail wheel guiding and support apparatus 142 may be mounted on the rear of the vehicle 10 as is illustrated in FIG. 7. While in substantially all respects it is identical to the front apparatus 118 and identical reference numerals have been applied thereto, it differs in that the railroad wheels 130 thereof are capable of being selectively powered by a reversible driving motor 144. In this way the entire vehicle can be driven on the railroad rails 86 with both the front and rear apparatuses lowered so that the wheels 12 and 14 are completely raised. As is illustrated in FIG. 8 this permits the widely spaced and larger diameter rear wheels to be elevated so that the vehicle and ripping apparatus 8 can fit through a standard bridge profile as indicated in phantom lines 146.

Referring next to diagrammatic FIG. 6, an alternate embodiment pair of ripper mechanisms 148 are illustrated, with reference characters corresponding to elements previously described appended thereto. Thus, the alternate ripper mechanisms are connected to the cross beam 63, and the cross beam can be either directly or indirectly connected to the rotatable circle mount 44. Each of the alternate mechanisms differ only in the construction of its ripping blade 150 which is convergingly tapered toward the centerline 17 and adapted to be equipped with a plurality of removable ripper teeth 152. This provides a mechanism which is more aggressive for fracturing more compacted and harder material and for allowing the teeth to be replaced.

FIG. 6 clearly illustrates also that the ripping apparatus 8 is capable of being angularly oriented with respect to the vehicle centerline by rotation of the circle mount 44. This orients the beam 63 also. Consequently, independent extension or retraction of the jacks 72 illustrated in FIGS. 4 and 5, can adjust the blades 150 to their working positions normal to the centerline and direction of vehicle travel as shown in FIG. 6. In the positions illustrated the lower blade is offset longitudinally forwardly of the upper blade. This may be advantageous for ripping certain materials other than a railroad bed, for example.

In operation, the vehicle 10 is capable of traversing over either highways or irregular terrain with the rail wheel apparatuses 118 and 142, the double plow apparatus 92 and the positioning device 26 for the ripper mechanisms 20 fully raised. It is initially driven into longitudinal alignment with the railroad rails 86 and the front railroad wheels 130 lowered by retraction of the jack 138 into a guiding position on the rails. This raises the front wheels from fully supporting the front end of the vehicle.

Next, the double plow apparatus 92 is lowered by retraction of the jack 104 so that the discs 100 provide a pair of parallel paths 91 as previously noted for both the rear wheels 14 and the retracted ripper mechanisms 20. Then the positioning device 26 is actuated to extend the lift jacks 28 and lower the ripper mechanisms in the paths provided at the opposite sides of the ties 88. Subsequently, the guide rollers 84 of the rail lifting apparatus 78 are laterally and interlockingly engaged with the rails and the jack 82 retracted to lift them to enable more rapid and effective fracturing of the bed by the ripper mechanisms.

As the vehicle moves forwardly the tippable mount 48 is rocked about the joints 49 in a slightly clockwise direction when viewing FIG. 1 by retraction of the jacks 56. This causes the blades 70 to tip also to better penetrate the bed as the jacks 72 are simultaneously extended to gradually position the blades from their retracted to their working positions as set forth earlier with respect to FIG. 5. Upon reaching the desired working position the tippable mount is rocked to a position wherein the blades neither pull downwardly nor upwardly, but rather float as they are pulled through the bed.

It is to be recognized that only one mechanism 20 need be operated at any given time, and that it may be tilted through changing the angular disposition of the holding structure 50 and including the cross beam 63. For example, the right blade 70 when viewing FIG. 4 may be tilted to the phantom position shown by retraction of the right lift jack 28 and extension of the left lift jack 28. Simultaneously, the lift blade could be fully retracted to a position where it is not ripping.

Turning now to the construction of a second alternate embodiment ripping apparatus 154 illustrated in FIGS. 9 and 10, wherein like parts carry like reference numerals, it is shown as mounted on one side of a vehicle support member 156 in a simplified manner, with it being understood that another apparatus of similar construction would be mounted on the other side. Basically, a pair of longitudinally aligned upper pivot joints 158, three spaced apart and longitudinally aligned lower pivot joints 160, and a universal actuator mounting joint 162 are provided on the support member. A horizontal plane 164 passes through the universal joint 162, and a vertical and longitudinally oriented plane 166 passes through the joints 158, 160 and 162.

Like the preferred embodiment, the material ripping element or blade and socket arrangement 70 is connected substantially to the bottom of the interconnected base and upstanding shaft 69, and the lever arm 71 is connected substantially to the top of the shaft. Also, the tubular housing 66 and its internal bearing assemblies, not shown, protectingly support the shaft and such components for rotary movement about the upright axis 73. However, a pair of upper arms 168 and a pair of lower arms 170 extend longitudinally outwardly from the opposite sides of the tubular housing to define a pair of upper pivot joints 172 and a pair of lower pivot joints 174 thereon. Advantageously, parallelogram linkage means 176 is provided for supporting the tubular housing on these respective pivot joints.

Specifically, linkage means 176 is preferably a parallelogram linkage assembly having a pair of upper links 178 respectively and individually interconnected between the joints 158 and 172, and a pair of lower links 180 similarly interconnected between the outer pair of joints 160 and the joints 174. A first fluid operated linear actuator or lift jack 182 is supported centrally between the upper links by a trunnion mount generally identified by the reference numeral 184. This jack has an extendable and retractable rod end 186 connected to the central pivot joint 160.

A second fluid operated linear actuator or swing jack 188 is desirably connected between the joints 74 and 162 on the lever arm 71 and support member 156 respectively for swinging the ripping element 70 in a generally horizontal plane between a retracted and longitudinally oriented position and a transversely disposed working position as was discussed generally above with respect to the preferred embodiment. Advantageously, however, the swing jack 188 is mounted in such a way that as the tubular housing 66 is raised by extension of the lift jack 182 the lever arm is automatically initially biased forwardly and the ripping element is biased rearwardly about the axis 73 prior to reaching the horizontal plane 164, and thereafter when the pivot joint 74 passes elevationally beyond such plane the lever arm is biased rearwardly and the ripping element forwardly again to thereby tuck the ripping element better into the confines of the vehicle for travel. Of course, it is to be understood that the ripping element is maintained in a generally horizontal plane as the tubular housing is elevated, and that the swing jack can be independently extended or retracted to position the ripper at any angular position between its extreme longitudinal and transverse positions.

In view of the foregoing, it is readily apparent that the ripping apparatus 8 an the ripping apparatus 154 of the present invention are extremely versatile tools which can effectively fracture material such as ballast bed from one or both sides thereof during forward movement of the vehicle on which they are mounted. Each construction advantageously employs a pair of ripper mechanisms, an improved support arrangement therefor, and a pair of linear actuators for positioning the ripping blades 70 into a variety of working attitudes with an improved mechanical advantage in resisting the rotational forces on the blades. Particularly, the linear actuators 72 and 188 resist working forces tending to rotate the blades about their respective axes 73 by bearing against the pivot joints 74 disposed on the lever arms 71.

While the invention has been described and shown with particular reference to a preferred embodiment, it will be apparent that variations might be possible that would fall within the scope of the present invention, which is not intended to be limited except as defined in the following claims.

The embodiments of the invention in which an exclusive property or privilege is claimed are defined as follows:

1. A ripping apparatus, connected to a frame of a vehicle having a longitudinal axis, comprising:
   a housing having a bearing assembly therein and defining an upright pivot axis;
   a ripper mechanism having an upright shaft member, a lever arm connected to the top of said shaft member, and an elongate ripping element connected substantially to the bottom of the shaft member, said shaft member being pivotally mounted in said bearing assembly of the housing;
   linkage means connected between said housing and said frame for raising and lowering said housing while maintaining said upright pivot axis in a substantially vertical condition and said ripping element in a substantially horizontal condition; and
   actuator means for rotating said lever arm, said shaft member and said material ripping element about said upright pivot axis, and for automatically swinging said ripping element away from and back toward said longitudinal axis in response solely to preselected elevation of said linkage means.

2. The ripping apparatus of claim 1 wherein said linkage means includes a parallelogram linkage assembly having a pair of upper links, a pair of lower links, and a fluid operated linear actuator connected between said upper links and said frame.

3. The ripping apparatus of claim 2 including a pivot joint connected to said frame, and wherein said actuator means includes another fluid operated linear actuator connected to said pivot joint and said lever arm.

* * * * *